US008081996B2

(12) United States Patent  
Kolavennu et al.

(10) Patent No.: US 8,081,996 B2  
(45) Date of Patent: Dec. 20, 2011

(54) INTEGRATED INFRASTRUCTURE FOR COEXISTENCE OF WI-FI NETWORKS WITH OTHER NETWORKS

(75) Inventors: Soumitri N. Kolavennu, Minneapolis, MN (US); Yunjung Yi, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1077 days.

(21) Appl. No.: 11/435,107

(22) Filed: May 16, 2006

(65) Prior Publication Data

US 2007/0268884 A1 Nov. 22, 2007

(51) Int. Cl.  
*H04J 3/06* (2006.01)
(52) U.S. Cl. ............. 455/509; 455/426.1; 455/447; 455/448; 455/450; 370/350
(58) Field of Classification Search ........... 455/426.1, 455/504, 509, 447, 448, 450; 370/350  
See application file for complete search history.

(56) References Cited

U.S. PATENT DOCUMENTS

| | | | |
|---|---|---|---|
| 6,314,108 B1 | 11/2001 | Ramasubramani et al. | 370/465 |
| 7,119,676 B1 * | 10/2006 | Silverstrim et al. | 340/531 |
| 2002/0061031 A1 * | 5/2002 | Sugar et al. | 370/466 |
| 2002/0087674 A1 | 7/2002 | Guilford et al. | 709/223 |
| 2002/0099465 A1 | 7/2002 | Su | 700/121 |
| 2002/0101859 A1 | 8/2002 | Maclean | 370/352 |
| 2004/0137915 A1 * | 7/2004 | Diener et al. | 455/456.1 |
| 2004/0141522 A1 * | 7/2004 | Texerman et al. | 370/466 |
| 2004/0162996 A1 | 8/2004 | Wallace et al. | 713/201 |
| 2004/0205111 A1 | 10/2004 | Chasmawala et al. | 709/201 |
| 2004/0233840 A1 | 11/2004 | Bye | 370/210 |
| 2004/0235468 A1 * | 11/2004 | Luebke et al. | 455/426.1 |
| 2005/0141465 A1 * | 6/2005 | Kato et al. | 370/337 |
| 2005/0195786 A1 * | 9/2005 | Shpak | 370/338 |
| 2006/0145842 A1 * | 7/2006 | Stilp | 340/539.22 |
| 2006/0193284 A1 * | 8/2006 | Stieglitz et al. | 370/328 |

FOREIGN PATENT DOCUMENTS

EP 1207654 A2 5/2002

(Continued)

OTHER PUBLICATIONS

Fast Layer 2 Handoff Between WLAN and 3G Cellular Networks; Dr. D.J. Shyy, Defense Information Systems Agency Facilitating Access Point Selection in IEEE 802.11 Wireless Networks; S. Vasudevan, K. Papagiannaki, C. Diot, J. Kurose, D. Towsley Sensors and Automation, Honeywell Wireless and Sensing Project; U.S. Department of Energy 2004.

*Primary Examiner* — Charles Appiah  
*Assistant Examiner* — William F Rideout  
(74) *Attorney, Agent, or Firm* — Kermit D. Lopez; Luis M. Ortiz; Tuesday A. Kaasch

(57) ABSTRACT

A wireless communications method and system includes an industrial sensor network that comprises a plurality of industrial sensors, which communicates with the industrial sensor network at a particular operating frequency band through one or more infrastructure nodes associated with the industrial sensor network. A wireless communications network is established, which includes a plurality of wireless communications stations that communicates with one or more of the infrastructure nodes. The infrastructure node(s) can be modified to additionally function as a wireless access point for the wireless communications network utilizing Time Division Multiplexing Algorithm (TDMA), thereby permitting the industrial sensor network to coexist and accommodate the wireless communications network.

15 Claims, 12 Drawing Sheets

FOREIGN PATENT DOCUMENTS

| | | |
|---|---|---|
| EP | 1480388 A2 | 11/2004 |
| WO | WO 01/03327 A3 | 11/2001 |
| WO | WO 03/067855 A2 | 8/2003 |
| WO | WO 03/067855 A3 | 8/2003 |
| WO | WO 2005/020518 A1 | 3/2005 |
| WO | WO 2005/046089 A1 | 5/2005 |

* cited by examiner

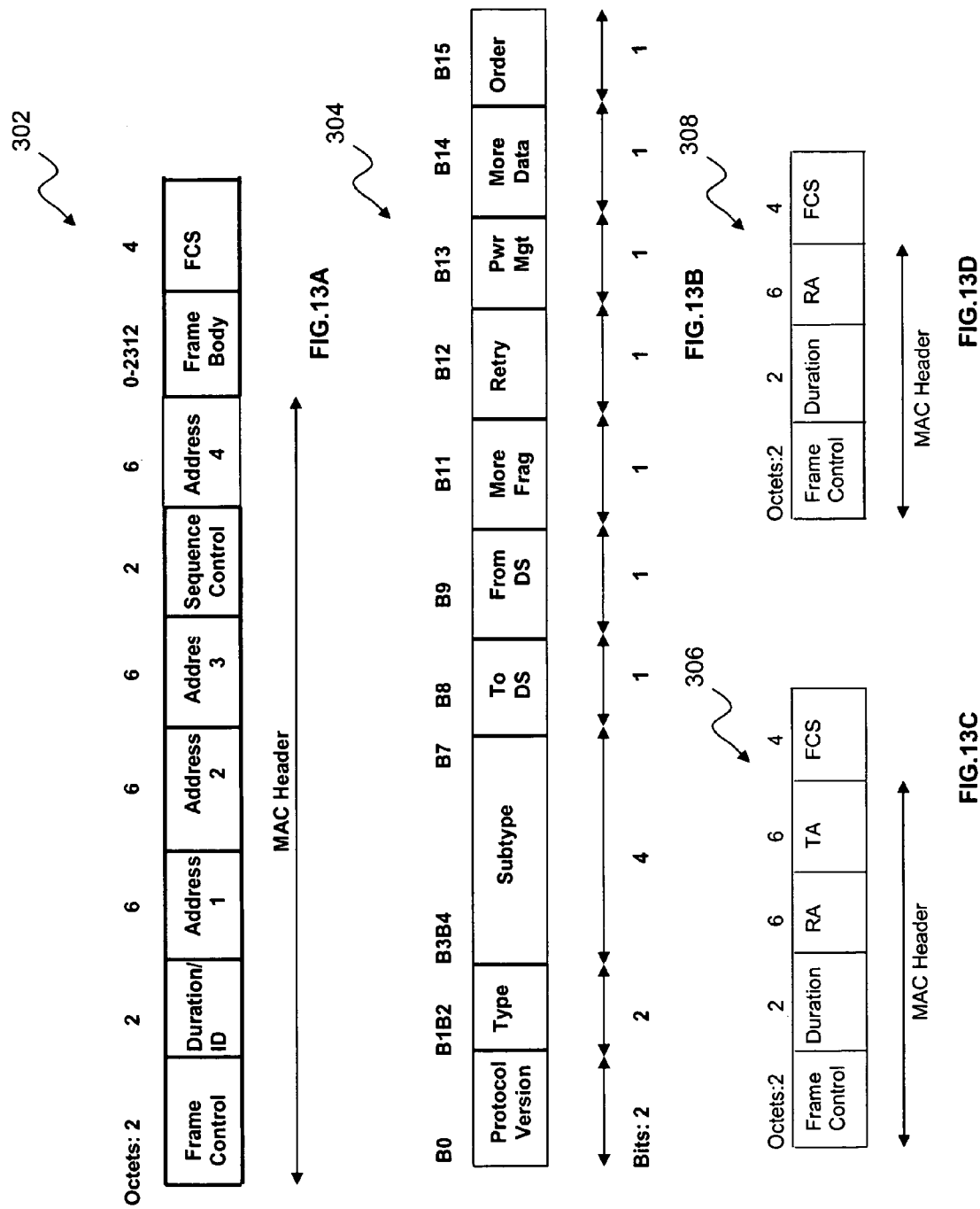

INTEGRATED INFRASTRUCTURE FOR COEXISTENCE OF WI-FI NETWORKS WITH OTHER NETWORKS

TECHNICAL FIELD

Embodiments are generally related to data communication methods and systems. Embodiments are additionally related to wireless communication methods and systems. Embodiments also relate to Wi-Fi networks and other types of wireless communications networks.

BACKGROUND OF THE INVENTION

Many processes and devices have been used for wireless communication for the past few years. A number of wireless integrated systems have been introduced for the monitoring and maintenance of industrial process systems. Two of the major products in this area are, for example, the IntelaTrac mobile PKS and the XYR 5000 wireless sensing devices.

The IntelaTrac system, for example, provides a mobile control room for operators in the field in an industrial environment. All process data including current and historical trends, plant layouts, piping and instrumentation diagrams, which are available for the operator in the control room, can now be accessed by the mobile wireless worker in the field. This can be achieved by laying out a wireless Wi-Fi infrastructure in the field and using a web pad that connects to the infrastructure for access to the data much like that found in an office setting. These communications are referred to as "Level 3" (i.e., an indication of the security of the data) communications.

Referring to FIG. 1, a diagram of a prior art system 10 is illustrated indicative of a communication architecture, which can be implemented in an industrial control system. System 10 can be used to manage workflow and field workforce activities 11. As indicated in FIG. 1, an intela trac work process system 12 can be implemented for mobile communication in association with an intela trac mobile manager 13. A wireless LAN (802.11b) provides data synchronization "on demand" for a mobile communication device 15, which provides level 3 communications. A reliability CM system 16 is also provided in association with a maintenance management system 17 and an ERP system (i.e. SAP) 18 with the assistance of an application network (TCP/IP). An operator console module 19 can be configured over the network by using a local control network and an application network (TCP/IP) for operational functionality of the entire system. An alert management system 20 can also be provided, which generates system alerts. Security can be provided by using a firewall 21, whose settings and historical trends are processed by a process historian 22 by enabling configuration with a local control network. A central loop 23 provides a functionality for image processing 25 and for video camera related conferencing.

The XYR5000 and next generation WNSIA based sensor networks also use wireless technologies. Such systems, however, are used to transmit periodic data from sensing elements in the field to controllers that monitor and/or control low level loops. Such a configuration can be referred to as a "Level 1" communication and may be provided through the use of a wireless infrastructure.

The two types of communications (i.e., Level 1 and Level 3) possess different data rates and range requirements. Hence, two wireless networks with different characteristics need to be laid out and implemented. Moreover since these solutions need to be globally applicable, these two networks should preferably operate in the same ISM band (2.4 GHz). This means that for both wireless networks to be operational in a plant, two different infrastructure nodes must be installed in the same plant or location. Also, the security requirements for Level 1 and Level 3 communications are different. As far as possible, these two levels of communication should be kept disjointed from one another. Any device that serves both communication levels should be certified as compliant with different security protocols and should guarantee the Quality of Service (QoS) limits of both networks.

The majority of industrial customers prefer a common integrated infrastructure that is maintainable in the field. Maintenance of the two different infrastructures would be cost prohibitive or may wipe out the cost benefits of a wireless network. One of the problems with prior art systems is that such configurations do not provide for the definition and design of a common infrastructure for a Local Sensor Network and an Application Level Network in the field. Such a system should preferably manage different security protocols depending on the level of the communications that it is serving.

FIG. 2 illustrates a graphical representation 20 with reference to a "backoff time". In general, the backoff time=Random ( )×a SlotTime, where Random ( ) is equivalent to a pseudorandom integer drawn from a uniform distribution over an interval [0,CW], where CW represents an integer within the range of values of the PHY characteristics aCWmin and a CWmax, wherein aCWmin≦CW≦aCWmax. It is important that designers recognize the need for statistical independence among the random number streams among one or more Slot Times (ST's) and that the SlotTime is equal to the value of the correspondingly named PHY characteristic.

Various types of wireless networks are often co-located or operate in a similar or the same frequency band. A typical wireless public network, for example, may be composed of a plurality of base stations that communicate with mobile stations. Each base station can communicate with mobile stations up to several miles away. Wireless local area network access points can be utilized for communicating with selected mobile stations located in the wireless local area network. An access point can be configured as a first transceiver that communicates with selected mobile stations within a short distance of the access point, a second transceiver that communicates with a first base station of the wireless public network. In such a configuration, interconnection circuitry can also be provided for transferring data traffic between the first transceiver and the second transceiver, such that the access point enables the selected mobile stations to communicate with the first base station via the access point.

A drawback with the use of different wireless networks and/or wireless communications protocols is that interference typically results between two or more wireless networks operating in the same frequency band. A need thus exists for the ability to overcome such interference and allow for the seamless coexistence of two or more networks as disclosed in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved wireless communication.

It is another aspect of the present invention to provide for a time division multiple access (TDMA) based infrastructure system that schedules the communications of level 1 and level 3 networks, and which incorporates all security protocols defined for these levels.

It is a further aspect of the present invention to provide for a system in which communications networks share information concerning the time frequency and possible codes indicative of each other's coexistence.

The aforementioned aspects and other objectives and advantages can now be achieved as described herein. A wireless communications method and system are disclosed. In general, wireless network can be provided, which may be composed of a group of sensors that communicates with the wireless network at a particular operating frequency band through one or more infrastructure nodes associated with the wireless network. An auxiliary wireless communications network can be established which includes a plurality of wireless communications stations that communicates with one or more of the infrastructure nodes at the same frequency band or at another operating frequency band. The infrastructure node(s) can be modified to additionally function as a wireless access point for the wireless communications network, thereby permitting the wireless network to coexist and accommodate the auxiliary wireless communications network.

The wireless network can be implemented, for example, as an industrial sensor network. A TDMA data structure can be implemented to support coexistence of the industrial sensor network and the wireless communications network. The wireless communications network can be provided as, for example, a Wi-Fi network, while the wireless access point can be configured as a Wi-Fi access point. The industrial sensor network communicates with one or more of the infrastructure nodes, for example, utilizing, but not limited to, a Frequency Hopping Spectrum (FHSS) mechanism. Additionally, the wireless access point can communicate with the wireless communications network utilizing, for example, but not limited to, an IEEE 802.11 communications protocol.

The method and system disclosed herein involves an approach based on a design and infrastructure that serves different types of networks utilizing, for example, a TDMA type scheduling. In such a design, time scheduling aspects of the architecture can be implemented while minimizing modifications and optimizations to protocol stacks of, for example, an 802.11 network and, for example, an industrial wireless sensor network. The system architecture is generally transparent to end nodes of wireless networks (e.g., Webpads in case of Level 3 networks). Additionally, sensor nodes in an industrial sensor network can be modified to transmit packets only at FHSS slots, depending upon design considerations. This means that the end devices can seamlessly integrate and communicate with the networks. These modifications and time scheduling aspects are restricted only to the infrastructure. A major functionality of the infrastructure is to orchestrate and communicate various end devices during their particular time slots.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIGS. 13A to 13D illustrate packet formats in association with an integrated infrastructure that supports the coexistence of Wi-Fi networks with other networks, in accordance with a preferred embodiment.

DETAILED DESCRIPTION

The particular values and configurations discussed in these non-limiting examples can be varied and are cited merely to illustrate at least one embodiment and are not intended to limit the scope thereof.

The embodiments disclosed herein may be executed in a variety of systems, including a variety of computers running under a number of different operating systems. The computer may be, for example, a personal computer, a network computer, a mid-range computer or a mainframe computer. In the preferred embodiment, the computer is utilized as a control point of network processor services architecture within a local-area network (LAN) or a wide-area network (WAN) based on wireless technology.

Figure 1:
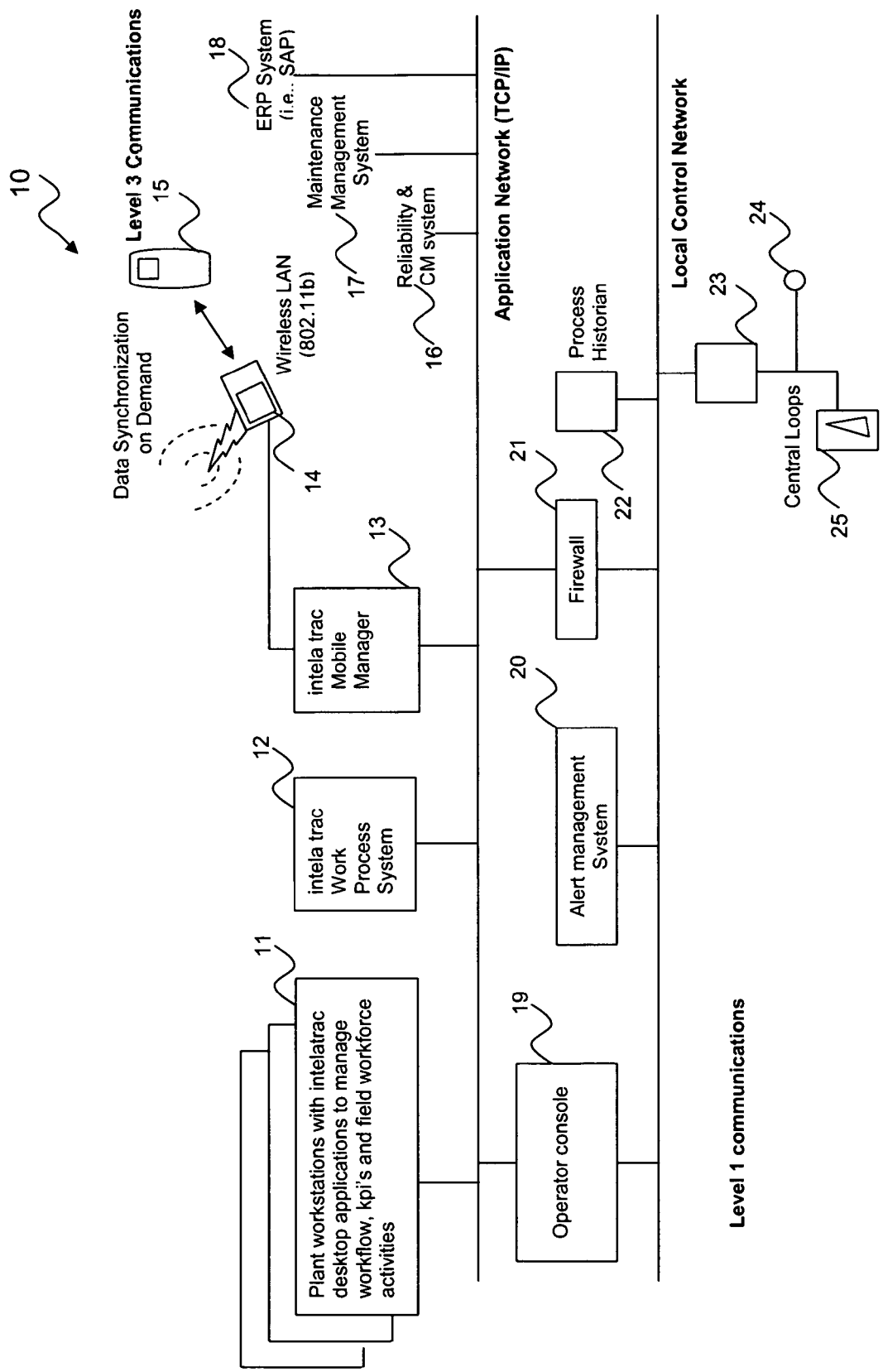
FIG. 1 illustrates a diagram of a prior art system indicative of a communication architecture, which can be implemented in an industrial control system.
Figure 2:
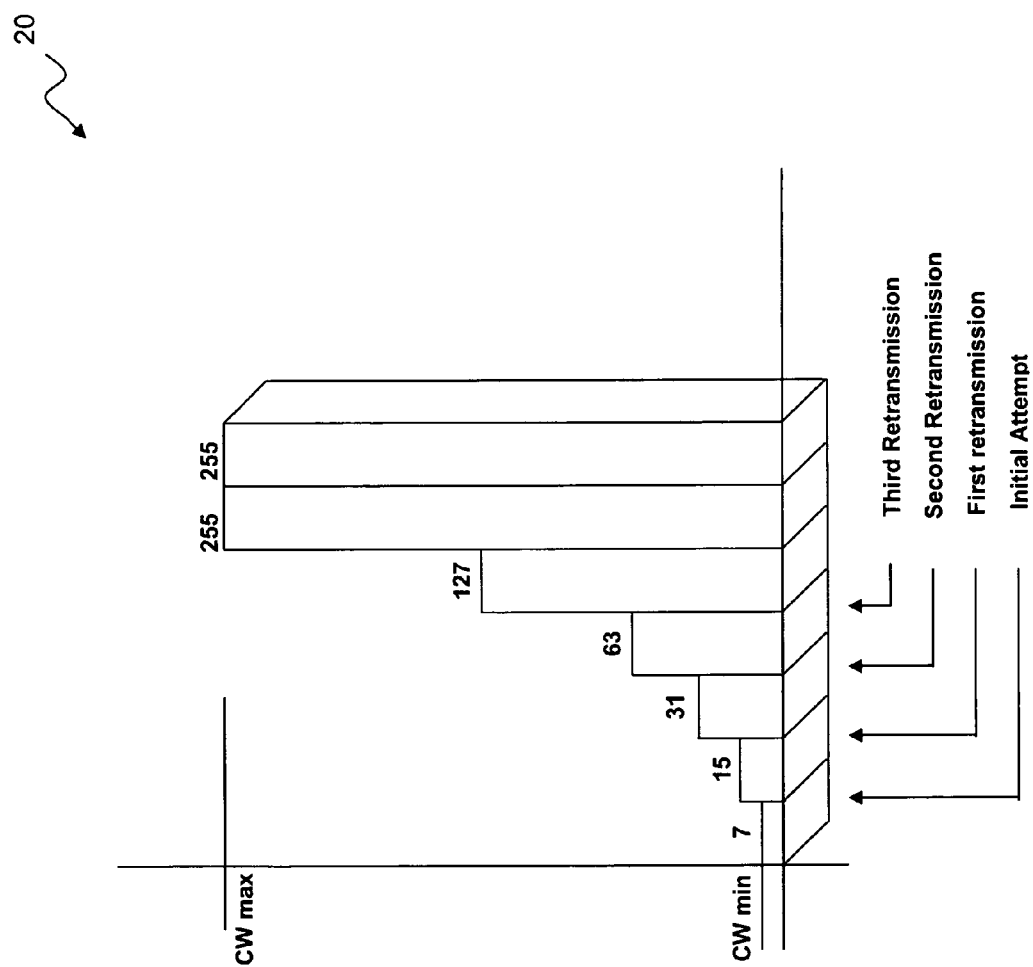
FIG. 2 illustrates a graphical representation with reference to a backoff time.
Figure 3:
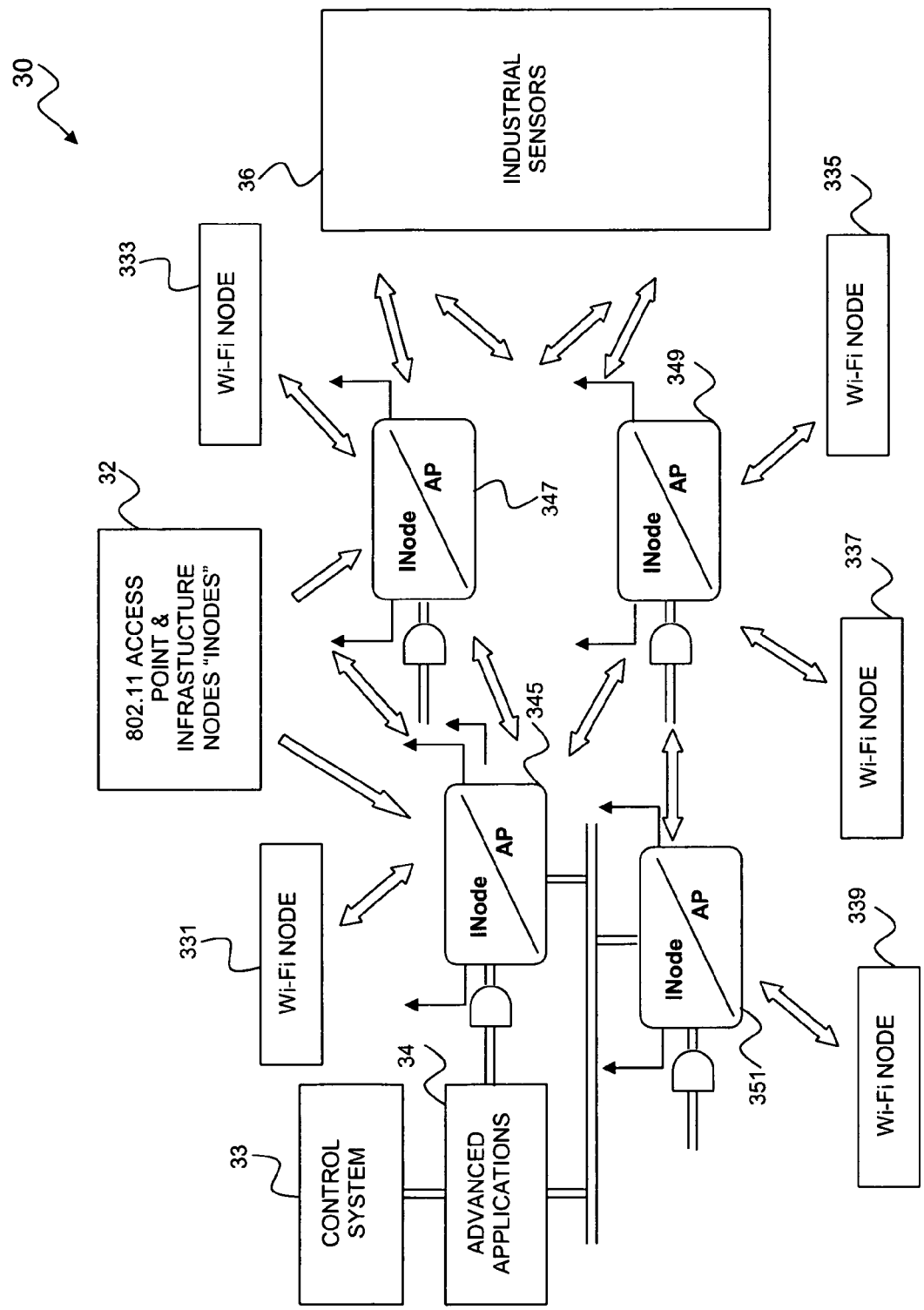
FIG. 3 illustrates a block diagram of a wireless application network system that is utilized support an integrated infrastructure for the coexistence of Wi-Fi networks with other networks in accordance with a preferred embodiment.

Referring now to the drawings and in particular to FIG. 3, a block diagram of a wireless application network system 30 is depicted, which can be utilized to support an integrated infrastructure for the coexistence of wireless networks (e.g., Wi-Fi networks) with other networks in accordance with a preferred. System 30 generally includes a plurality of Wi-Fi nodes 331, 333, 335, 337, and 339 that incorporates wireless communication for Wi-Fi end users. System 30 also includes a plurality of industrial infrastructure nodes 345, 347, 349, 351 and one or more industrial sensors 36. In the network of system 30, industrial sensors 36 and Wi-Fi nodes 331, 333, 335, 337, and 339 can communicate with an infrastructure 32 that defines one or more wireless access points.

System 30 further includes one or more advanced applications 34 that function as the software-related portion of system 30. Network monitoring can be accomplished through the use of the advanced applications 34 coupled with a control system 33 in order to control the entire system 30. Each industrial infrastructure nodes 345, 347, 349, 351 can also behave as an access point for a Wi-Fi station. Note that the term "industrial infrastructure node" can be referred to by the term "INode". To support two different communication paradigms, wherein the first communication type includes data transfer from one or more industrial sensors 36 to one or more of INodes 345, 347, 349, 351, and one or more INodes 345, 347, 349, 351 to another INode, a Frequency Hopping Spread Spectrum (FHSS) mechanism can be utilized. Second, a Wi-Fi station can transmit data to an access point and an access point to another access point using, for example, but not limited to an IEEE 802.11 communications protocol.

In general, FHSS can be described as a transmission technology used in particular transmissions, wherein the data signal is modulated with a narrowband carrier signal that "hops" in a random but predictable sequence from frequency to frequency as a function of time over a wide band of frequencies. The signal energy is spread in time domain rather than chopping each bit into small pieces in the frequency domain. This technique reduces interference because a signal from a narrowband system will only affect the spread spectrum signal if both are transmitting at the same frequency at the same time. If synchronized properly, a single logical channel is maintained. The transmission frequencies are determined by a spreading, or hopping, code. The receiver must be set to the same hopping code and must listen to the incoming signal at the right time and correct frequency in order to properly receive the signal.

Note that although the use of a FHSS is discussed herein, it can be appreciated that other communications protocols can be utilized in place of or in addition to a FHSS. For example, the embodiments can be configured to permit the described industrial sensor network to communicate with one or more infrastructure nodes utilizing an IEEE 802.15.1 Bluetooth communications protocol and/or an IEEE 802.15.4 ZigBee communications protocol in addition to or in place of FHSS, depending upon design considerations.

Figure 4:
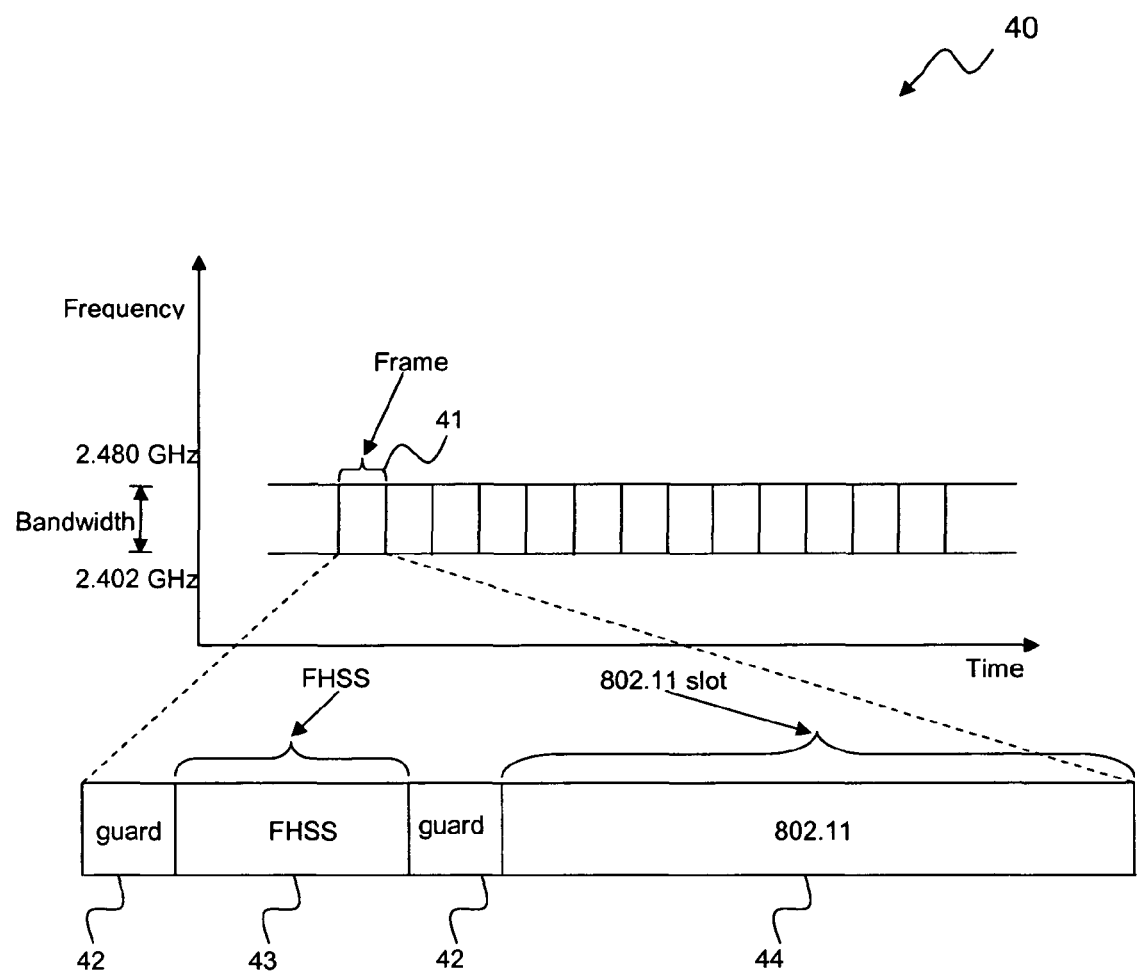
FIG. 4 illustrates a block diagram of a super frame TDMA data structure that can be utilized to support an integrated infrastructure for the coexistence of Wi-Fi networks with other networks in accordance with a preferred embodiment.

FIG. 4 illustrates a block diagram of a super frame TDMA data structure 40 that can be utilized to implement a TDMA scheme that supports an integrated infrastructure for the coexistence of Wi-Fi networks with other networks in accordance with a preferred embodiment. As depicted in FIG. 4, the TDMA data structure 40 can be provided as a super frame TDMA (Time-Division Multiple Access) data structure that supports two types of data transfers First, the TDMA data structure 40 constitutes a communications type that includes data transfer from an industrial sensor to an INode and an INode to another INode using a Frequency Hopping Spread Spectrum mechanism, as illustrated above with respect to FIG. 3. Second, a Wi-Fi station can transmit data to an access point and an access point to another access point using an IEEE 802.11 protocol. Note that a Frequency Hopping Spread Spectrum (FHSS) MAC 43 and an IEEE 802.11 (802.11) MAC 44 can share a 2.4 GHz ISM band.

To use a TDMA scheme, industrial sensors, such as sensors 36 depicted in FIG. 3 and INode/AP nodes can be synchronized. Since FHSS MAC requires global time synchronization, one can assume the use of a globally synchronized clock among these devices. With a synchronized clock as indicated by a TDMA super frame 41, the total time can be divided into equally-sized frames wherein each frame is composed of a guard time 42, an FHSS slot 43, a guard time 42, and an 802.11 slot 44. In an FHSS slot, an INode/AP behaves as an INode and becomes an AP in an 802.11 slot. The industrial sensors 36 depicted in FIG. 3 can attempt to transmit data to an INode only in the FHSS slot 43 and can then go to "sleep" in the 802.11 slot 44. The period of guard time is very small (e.g., 40 us). The duration of the FHSS 43 slot and 802.11 slot 44 can be decided based on two components: (1) minimizing the packet drops from Wi-Fi stations which are not aware of FHSS slots; and (2) allowing enough time to FHSS slot to satisfy bandwidth requirement of industrial sensors.

Figure 5:
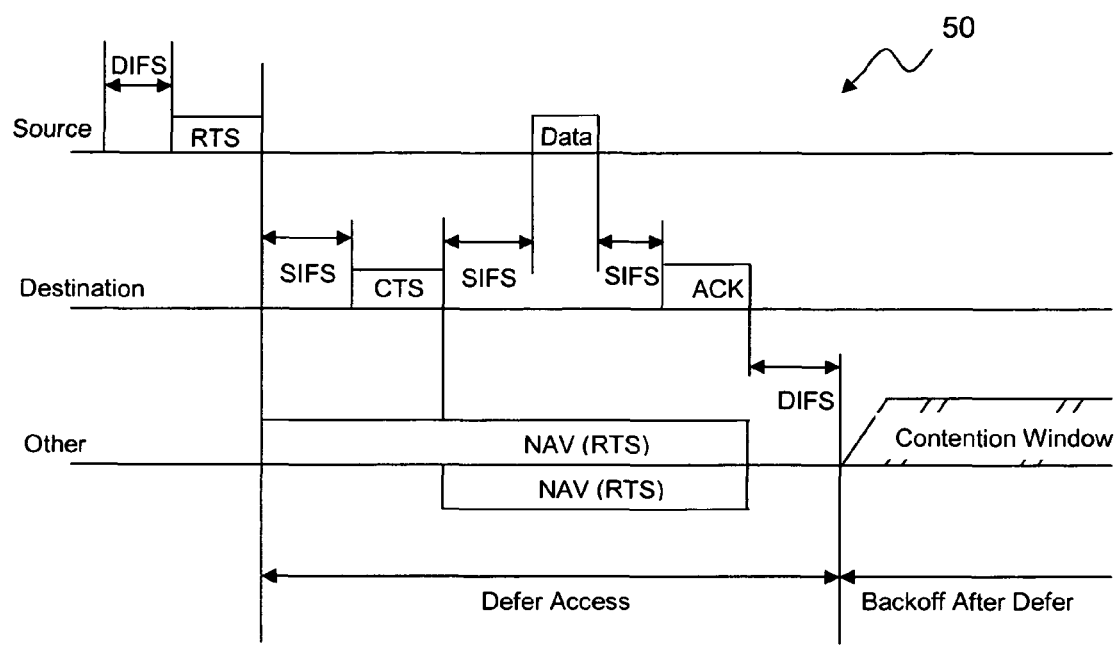
FIG. 5 illustrates an event flow diagram of IEEE 802.11 DCF to support integrated infrastructure for coexistence of Wi-Fi networks with other networks in accordance with a preferred embodiment.

FIG. 5 illustrates an event flow diagram 50 of IEEE 802.11 DCF (Distributed Coordination Function) mode. In an 802.11 DCF mode, each node can access a shared medium by utilizing a Carrier Sensing Medium Access/Collision Avoidance (CSMA/CA) mechanism. Since DCF mode is mostly used in Wi-Fi communication, in DCF mode, each node attempts to transmit a packet if it senses idle medium more than DIFS time. With a packet whose size is larger than RTS_Threshold, the sender and receiver will handshake via RTS/CTS/DATA/ACK procedure. Note that as utilized herein the acronym "RTS" generally refers to "Request to Send" and "CTS" refers to "Clear to Send". All other nodes who hear RTS, CTS or DATA will set NAV (Network Allocation Vector) and keep quite for NAV duration. Once the transmission ends and the channel become idle, each node having the packet to transmit sets a random backoff timer to avoid simultaneous channel access. Once the backoff timer expires, it will attempt to transmit a packet. Note that the embodiments disclosed herein result in the transmission via a transmission mechanism of a "dummy" or unsolicited CTS signal at an end of a 802.11 time slot (e.g., predefined time period)_from one or more infrastructure nodes, where the NAV duration of this unsolicited CTS is equal to the size of guard+FHSS slot size+guard. Upon receiving a dummy CTS, 802.11 stations will keep quite for the NAV duration. Thus 802.11 stations will not interfere transmissions with industrial sensors in an FHSS slot.

Figure 6:
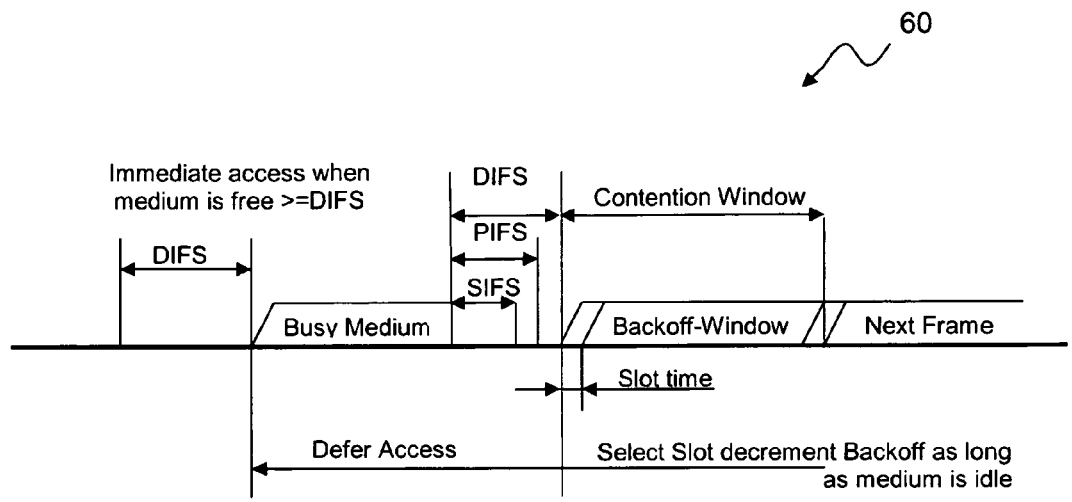
FIG. 6 illustrates an event flow diagram of backoff mechanism to support integrated infrastructure for coexistence of Wi-Fi networks with other networks in accordance with a preferred embodiment.

FIG. 6 illustrates an event flow diagram 60 of a backoff mechanism. The backoff timer will be decreased only when the medium is idle and suspended when any channel activity is observed (such as busy channel by carrier sensing or NAV setting). Once the channel becomes idle again for DIFS or EIFS time, it will resume decrease. Thus, a Wi-Fi station will not decrease backoff timer if industrial sensors or INodes use the same frequency to the Wi-Fi station in an FHSS slot, such as, for example, the FHSS slot 43 depicted in FIG. 4.

Figure 7:
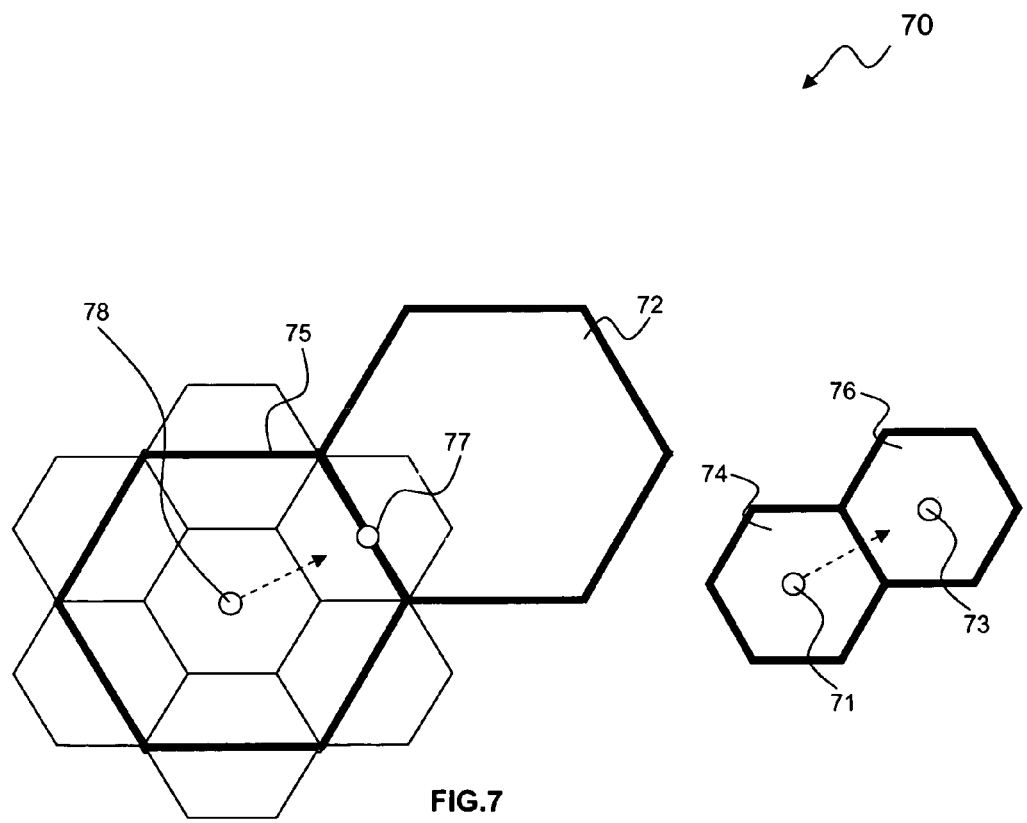
FIG. 7 illustrates a block diagram of different power levels of FHSS to support integrated infrastructure for coexistence of Wi-Fi networks with other networks in accordance with a preferred embodiment.

FIG. 7 illustrates a block diagram of a system 70 of different power levels of FHSS to support an integrated infrastructure for the coexistence of Wi-Fi networks with other networks in accordance with a preferred embodiment. As depicted in FIG. 7 that shows the cellular division in wireless networks. The FHSS range is configured using the cell portions 72, 74 with the nearby cell i.e. 73. IEEE 802.11 range is gauged that shows 75, 71. The interference area range is configured shown in 77, 73. The cell 78 and its integration related with FHSS range and 802.11 range. The larger power of FHSS is based on potential interfering 802.11 stations that can sense channel busy thereby to prevent hidden terminals TX attempt. The same power of FHSS is based on potential interfering of IEEE 802.11 stations that may cause collision. The embodiment depicted in FIG. 7 generally describes a system 70 or mechanism for varying the power level of transmission from one or more infrastructure nodes. Such a technique can be utilized in association with the previously described feature of transmitting a dummy or unsolicited CTS signal at the end of a predefined time period from one or more of the infrastructure node.

Figure 8:
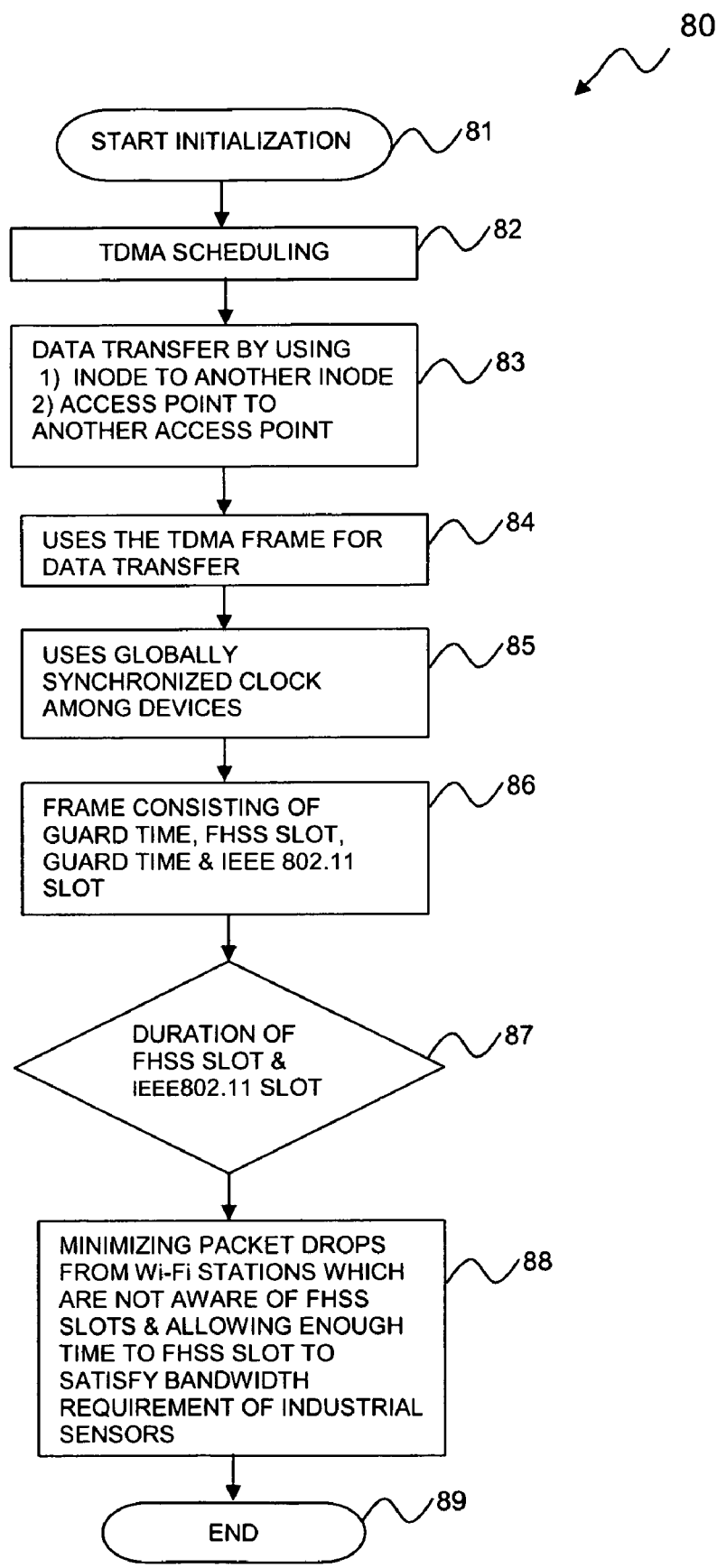
FIG. 8 illustrates a high-level flow chart of operations illustrating logical operational steps for providing a TDMA scheme to support an integrated infrastructure for the coexistence of Wi-Fi networks with other networks in accordance with a preferred embodiment.

FIG. 8 illustrates a high-level flow chart 80 of operations illustrating logical operational steps for implementing a TDMA scheme to support an integrated infrastructure for the coexistence of Wi-Fi networks with other networks in accordance with a preferred embodiment. As depicted at block 81, initialization can occur. Next, as indicated at block 82, the TDMA scheduling can be established. Data transfer can be accomplished by using INode to another INode and by using an access point (AP) to another access point (AP) as depicted at block 83 and by using the TDMA frame the data transfer is done as described at block 84.

As described at block 85, a globally synchronized clock can be used among devices. Thereafter, as indicated at block 86, a frame can be transferred such that the frame is composed of a guard time, an FHSS slot, a guard time and/or an IEEE 802.11. The transmission is based on the duration of an FHSS slot and an IEEE 802.11 slot as depicted at block 87. Next, as described at block 88, minimizing packet drops from Wi-Fi stations, which are not aware of FHSS slots, and allowing enough time to FHSS slot can be utilized to satisfy bandwidth requirement of industrial sensors, such as the industrial sensors 36 depicted in FIG. 3. The process can then terminate as indicated at block 89.

Figure 9:
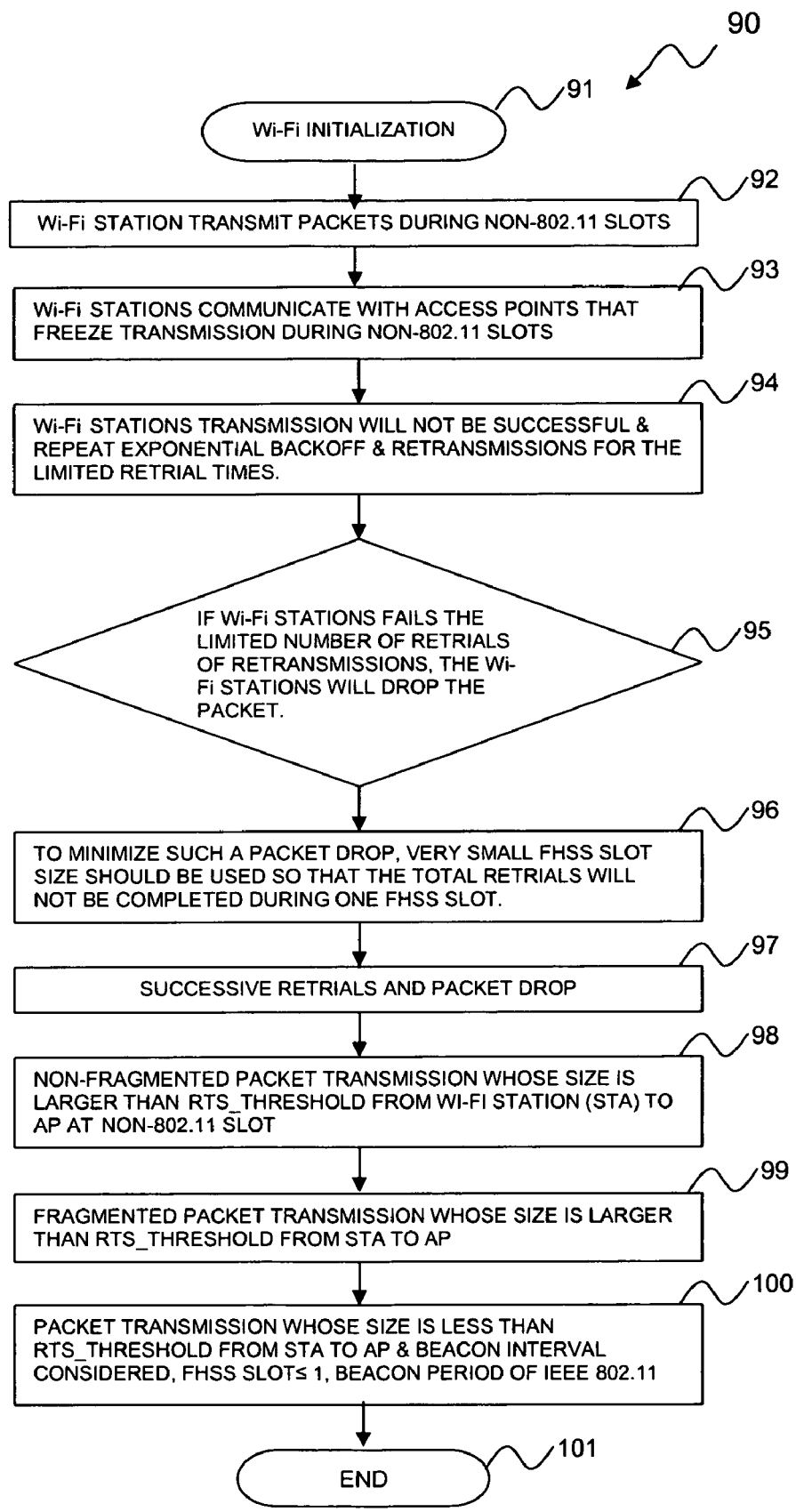
FIG. 9 illustrates a high-level flow chart of operations illustrating logical operational steps for providing Wi-Fi data transmission to support an integrated infrastructure for the coexistence of Wi-Fi networks with other networks in accordance with a preferred embodiment.

FIG. 9 illustrates a high-level flow chart 90 of operations illustrating logical operational steps for providing Wi-Fi data transmission to support an integrated infrastructure for the coexistence of Wi-Fi networks with other networks in accordance with a preferred embodiment. As depicted at block 91 a Wi-Fi initialization can occur. Next, as depicted at block 92 a Wi-Fi station can transmit packets during non-802.11 slots. Wi-Fi stations communicate with access points that freeze transmission during non-802.11 slots as indicated at block 93. Thereafter as described at block 94, the Wi-Fi stations transmission may not be successful. Thus, it may be necessary to repeat an exponential backoff and provide for re-transmissions for a limited number of retrial times. If the Wi-Fi stations fail during the limited number of transmission retrials, the Wi-Fi stations can drop the packet as indicated at block 95.

Next, as indicated at block 96, in order to minimize such a packet drop, a very small FHSS slot size should be used so that the total retrials will not be completed during one FHSS slot thereby permitting successive retrials and packet drops to occur as indicated thereafter at block 97. Following processing of a non-fragmented packet transmission whose size is larger than RTS_Threshold from a Wi-Fi station (STA) to AP at a non-802.11 slot as indicated at block 98, the operation described at block 99 can be processed, in which fragmented packet transmissions are permitted whose size is larger than an RTS_Threshold from STA to AP. Finally, as described at block 100, the packet transmission whose size is less than RTS_threshold from STA to AP and beacon interval can be considered such that an FHSS slot≦1 (i.e., a beacon period of IEEE 802.11). The process can then terminate as indicated at block 101.

Figure 10:
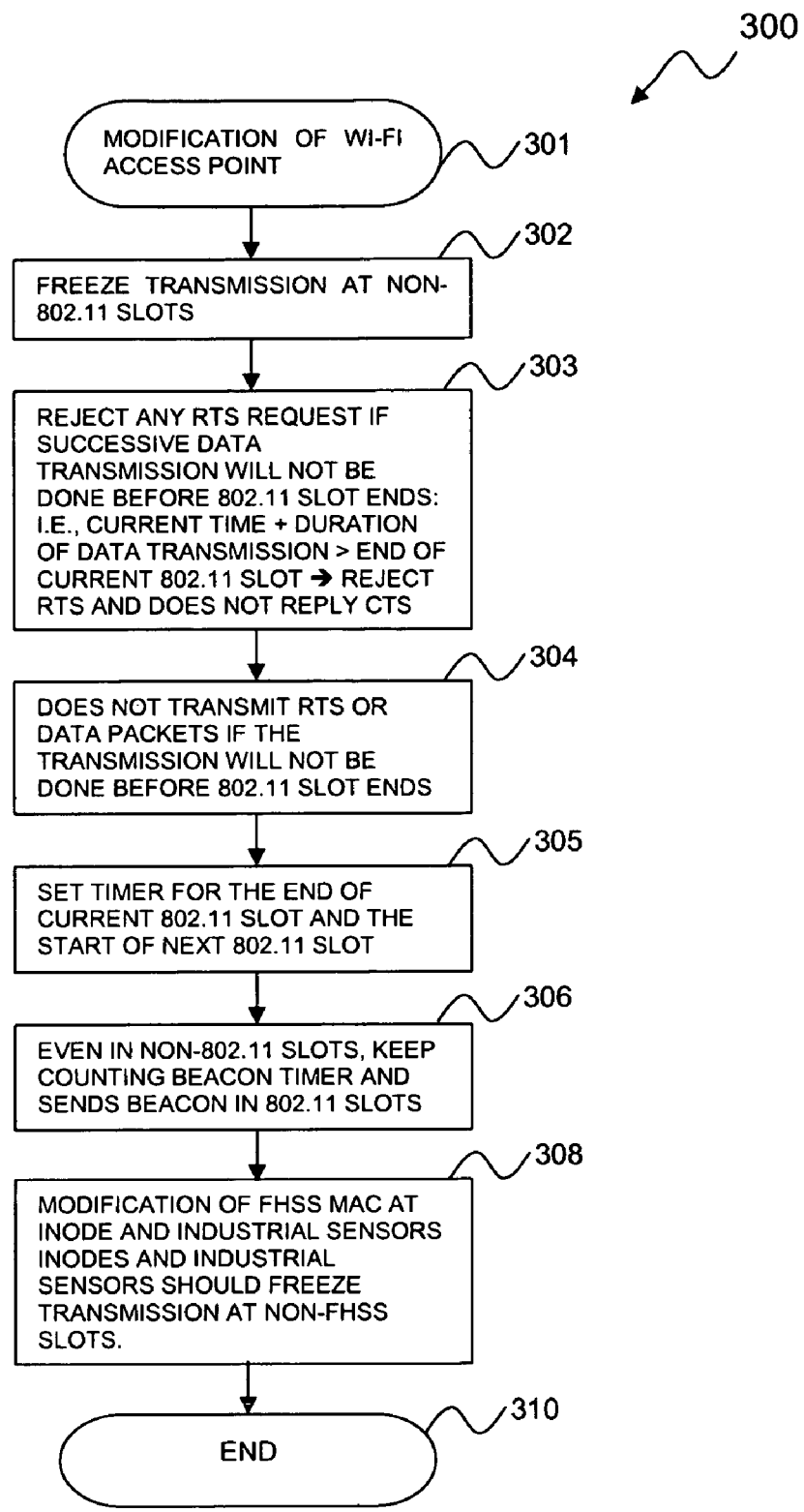
FIG. 10 illustrates a high-level flow chart of operations illustrating logical operational steps for Wi-Fi access point modification to support an integrated infrastructure for the coexistence of Wi-Fi networks with other networks in accordance with a preferred embodiment.

FIG. 10 illustrates a high-level flow chart 300 of operations illustrating logical operational steps for Wi-Fi access point modification to support an integrated infrastructure for the coexistence of Wi-Fi networks with other networks in accordance with a preferred embodiment. As depicted at block 301, a Wi-Fi access point can be modified, thereby freezing transmission at non-802.11 slots as indicated thereafter at block 302. Next, as indicated at block 303, an RTS request may be rejected if successive data transmissions are not accomplished before an 802.11 slot ends according to the following formulation: current time+ duration of data transmission> end of current 802.11 slot→ reject RTS and does not reply with a CTS (Clear to Send). An RTS or DATA packet may not be transmitted if the transmission is not accomplished before the 802.11 slot ends as described at block 304. Next, as indicated at block 305, the timer for the end of the current 802.11 slot and the start of the next 802.11 slot can be set. A counting beacon timer can send a beacon in 802.11 slots as described thereafter at block 306. Next, as indicated at block 308 the modification of an FHSS MAC at an iNode and industrial sensors should freeze transmission at non-FHSS slots. The process can then terminate as indicated at block 310.

Figure 11:
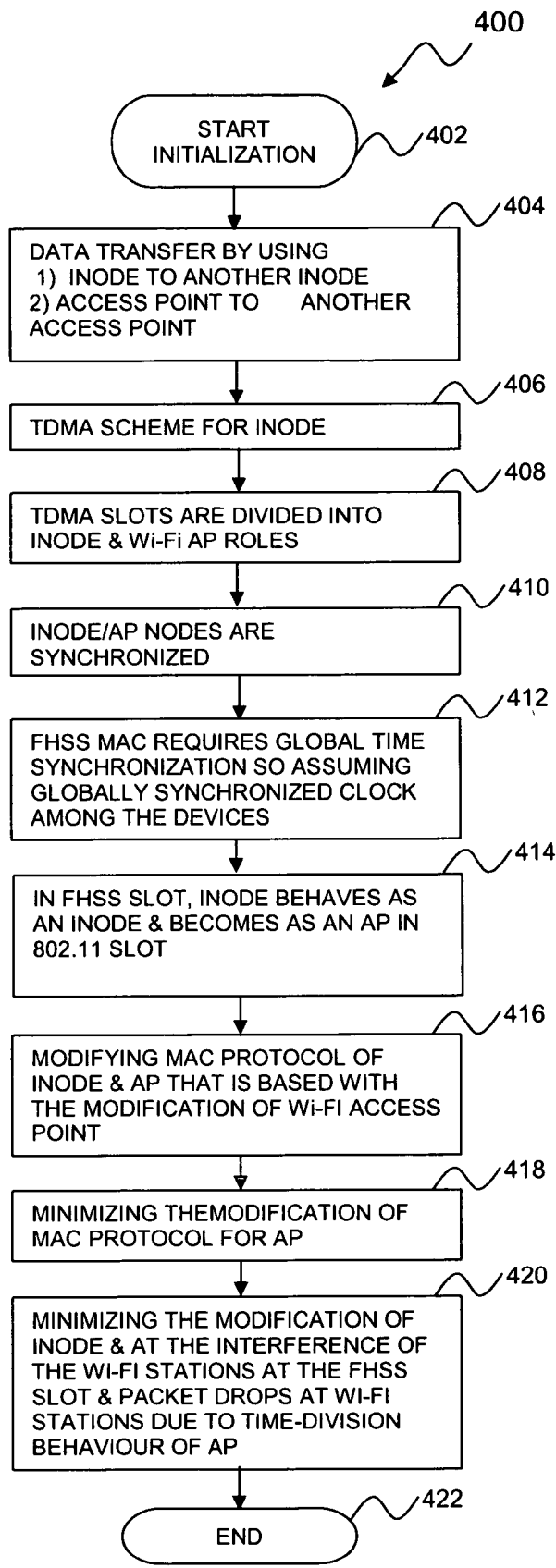
FIG. 11 illustrates a high-level flow chart of operations illustrating logical operational steps with reference to iNode for Wi-Fi access point modification to support an integrated infrastructure for the coexistence of Wi-Fi networks with other networks in accordance with a preferred embodiment.

FIG. 11 illustrates a high-level flow chart 400 of operations illustrating logical operational steps with reference to INode for Wi-Fi access point modification to support an integrated infrastructure for the coexistence of Wi-Fi networks with other networks in accordance with a preferred embodiment. As depicted at block 402, initialization can occur. Data transfer can be accomplished by using INode to another INode and by using an access point (AP) to another access point (AP) as depicted at block 404 and by using the TDMA scheme for data transfer for INode is done as described at block 406.Thereafter, as described at block 408 the TDMA slots are divided into INode and Wi-Fi AP roles.

Next as depicted at block 410. The FHSS MAC requires global synchronization, assuming the use of a globally synchronized clock among the devices as described at block 412. In the FHSS slot, the node behaves as an INode and can function as an AP in an 802.11 slot as indicated at block 414. The MAC protocol of an INode and an AP may be modified based on the modification of the Wi-Fi access point as depicted at block 416. Next, as indicated at block 418, the modification of the MAC protocol for the AP can be minimized. The modification of the INode and the interference of the Wi-Fi stations at the FHSS slot and packet drops at Wi-Fi stations can be finally modified due to the time-division behavior of the AP as indicated at block 420. The process can then terminate as indicated at block 422.

Figure 12:
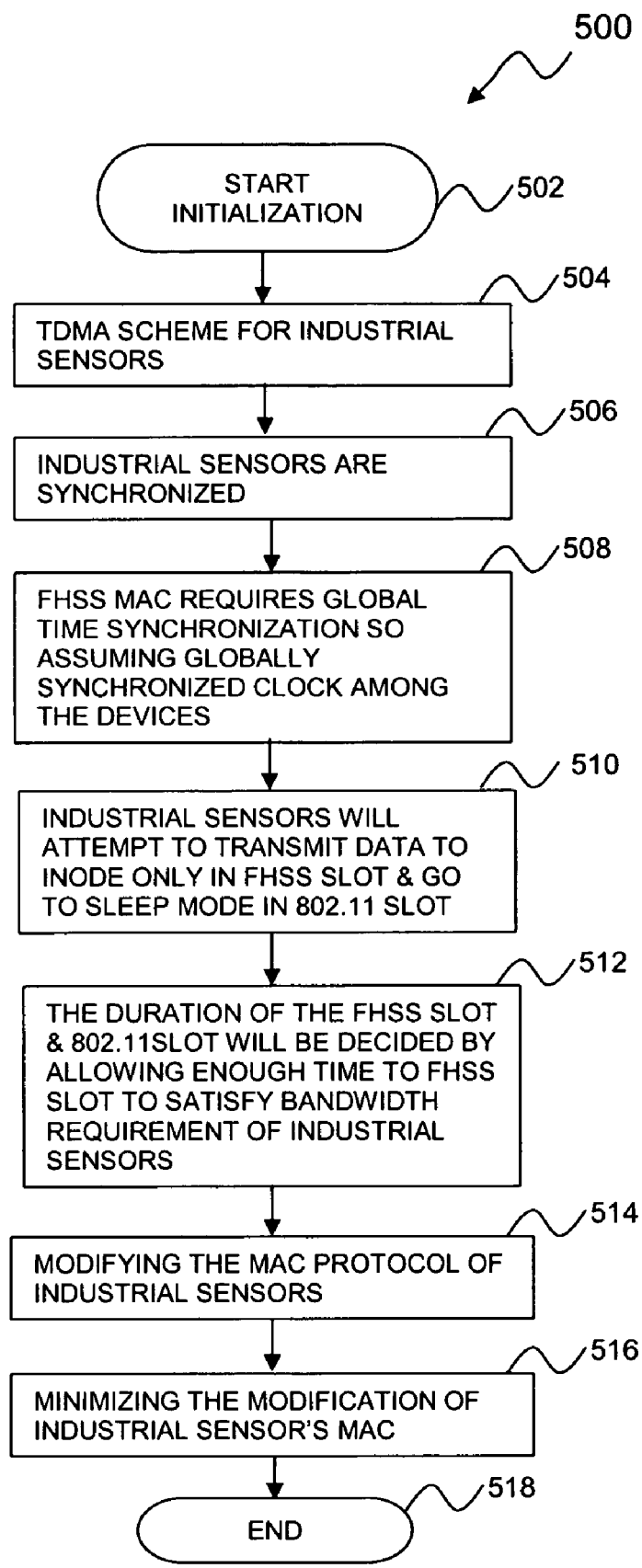
FIG. 12 illustrates a high-level flow chart of operations illustrating logical operational steps with reference to industrial sensors for Wi-Fi access point modification to support an integrated infrastructure for the coexistence of Wi-Fi networks with other networks in accordance with a preferred embodiment.

FIG. 12 illustrates a high-level flow chart 500 of operations illustrating logical operational steps with reference to industrial sensors for Wi-Fi access point modification to support an integrated infrastructure for the coexistence of Wi-Fi networks with other networks in accordance with a preferred embodiment. As depicted at block 502, initialization can occur. By using the TDMA scheme for data transfer for industrial sensors is done as described at block 504 by which the industrial sensors are synchronized as indicated at block 506. The FHSS MAC requires global time synchronization so assuming globally synchronized clock among the devices as described at block 508. Thereafter as described at block 510, the industrial sensors can attempt to transmit data to INode only in an FHSS slot and then move into a "sleep mode"

within an 802.11 slot. The duration of the FHSS slot and the 802.11 slots can be determined by allowing sufficient time for an FHSS slot to satisfy the bandwidth requirement of industrial sensors as indicated at block 512. Next, as depicted at block 514 modifying the Mac protocol of industrial sensors. Finally, the modification of industrial sensor's MAC can be minimized as indicated at block 516. The process can then terminate as indicated at block 518.

FIGS. 13A-13D illustrate the block diagrams of respective packet formats 302, 304, 306 and 308 in association with an integrated infrastructure to support the coexistence of Wi-Fi networks with other networks in accordance with a preferred embodiment. FIG. 13A illustrates a format 302 in which a MAC frame format (i.e., data frame) is composed of frame control, duration ID, address1, address2, address3, sequence control, address, frame body and frame check sequence (FCS). FIG. 13B illustrates a format 304 in which a frame control field is composed of a protocol version, type, subtype, to destination source (DS), from destination source (DS), more flag, retry, power management, more data, WEP and order data. FIG. 13C illustrates a format 406 that includes an RTS frame with 20 bytes consisting of frame control, duration, RA, TA and frame check sequence (FCS). FIG. 13D illustrates a format 308 in which a CTS frame is provided with 14 bytes including frame control, duration, RA and frame check sequence (FCS).

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A wireless communications method, comprising:
providing a wireless network comprising a plurality of sensors that communicate with said wireless network at a particular operating frequency hopping spectrum through at least one infrastructure node associated with said wireless network, said wireless network further comprising 802.11 slots and non-802.11 slots;
establishing an integrated auxiliary wireless communications network comprising a plurality of wireless communications stations that communicate with said at least one infrastructure node;
transmitting an unsolicited CTS signal at an end of a time period from said at least one infrastructure node;
varying a power level of a transmission from said at least one infrastructure node; and
modifying said at least one infrastructure node to additionally function as a wireless access point for said auxiliary wireless communications network, permitting said wireless network to coexist and accommodate said auxiliary wireless communications network, wherein modifying said infrastructure node comprises:
freezing transmission during said non-802.11 slots;
rejecting a Request to Send (RTS) if successive data transmissions are not accomplished before said 802.11 slot ends;
setting a timer for the end of said 802.11 slot and the start of a next 802.11 slot among said 802.11 slots; and
sending a beacon during said 802.11 slots utilizing a counting beacon timer.

2. The method of claim 1 further comprising providing a TDMA protocol to support said wireless network and said auxiliary wireless communications network.

3. The method of claim 1 wherein said time period comprises a predefined time period.

4. The method of claim 1 wherein said wireless network comprises an industrial sensor network.

5. The method of claim 1 wherein said auxiliary wireless communications network comprises a Wi-Fi network having a different security level than said wireless network.

6. The method of claim 5 wherein said wireless access point comprises a Wi-Fi access point.

7. The method of claim 4 further comprising:
permitting said industrial sensor network to communicate with said at least one infrastructure node utilizing a Frequency Hopping Spectrum mechanism.

8. The method of claim 4 further comprising:
permitting said industrial sensor network to communicate with said at least one infrastructure node utilizing an IEEE 802.15.4 ZigBee communications protocol.

9. The method of claim 1 further comprising:
permitting said wireless access point to communicate with said auxiliary wireless communications network utilizing an IEEE 802.11 communications protocol.

10. The method of claim 1 further comprising:
synchronizing a clock on said auxiliary wireless communications network side with said wireless network and said at least one infrastructure node to orchestrate communications in a TDMA manner.

11. An integrated wireless communications system, comprising:
a wireless network comprising a plurality of sensors that communicates with said wireless network at a particular operating frequency band through at least one infrastructure node associated with said wireless network, said wireless network further comprising 802.11 slots and non-802.11 slots;
a transmission mechanism for transmitting an unsolicited CTS signal at an end of a predefined time period from said at least one infrastructure node;
a power mechanism for varying a power of transmission in said at least one infrastructure node; and
an auxiliary wireless communications network comprising a plurality of wireless communications stations that communicates with said at least one infrastructure node at another operating frequency, wherein said at least one infrastructure node is modified to additionally function as a wireless access point for said auxiliary wireless communications network, thereby permitting said wireless network to coexist and seamlessly accommodate auxiliary said wireless communications network, wherein modifying said infrastructure node comprises:
freezing transmission during said non-802.11 slots;
rejecting a Request to Send (RTS) if successive data transmissions are not accomplished before said 802.11 slot ends;
setting a timer for the end of said 802.11 slot and the start of a next 802.11 slot among said 802.11 slots; and
sending a beacon during said 802.11 slots utilizing a counting beacon timer.

12. The system of claim 11 further comprising a TDMA protocol to support said wireless network and said auxiliary wireless communications network.

13. A wireless application network system comprising:
- a plurality of industrial infrastructure nodes that acts as access points for a plurality of Wi-Fi stations, said plurality of Wi-Fi stations communicate with said plurality of infrastructure nodes;
- a plurality of industrial sensors, wherein said plurality of industrial sensors communicate with said plurality of industrial infrastructure nodes, wherein said sensors and industrial infrastructure nodes utilize a globally synchronized clock;
- a TDMA data structure utilized to implement a TDMA scheme that simultaneously supports a frequency hopping spread spectrum (FHSS) protocol and an IEEE 802.11 protocol;
- a backoff timer associated with said TDMA scheme to allow transmission of a packet when said backoff timer expires;
- said FHSS protocol supporting data transfer from at least one industrial sensor among said plurality of industrial sensors to at least one industrial infrastructure node among said plurality of industrial infrastructure nodes;
- said IEEE 802.11 protocol supporting data transfer from at least one Wi-Fi station among said plurality of Wi-Fi stations to at least one access point among said access points; and
- said TDMA scheme further comprising equally sized time frames, wherein each time frame among said equally sized time frames comprises a plurality of guard times, an FHSS slot, and a 802.11 slot, wherein an unsolicited CTS signal is transmitted at termination of said 802.11 slot, said unsolicited CTS signal having a Network Allocation Vector (NAV) duration equal to the sum of a FHSS slot size and twice the size of one of said plurality of guard times, and wherein a duration of said FHSS slot and said 802.11 slot is determined based on minimizing packet drops from said plurality of Wi-Fi stations, which is not aware of said FHSS slots, and allowing a sufficient time for said FHSS slot to satisfy bandwidth requirements of said plurality of industrial sensors.

14. The system of claim 13 wherein during said FHSS slot, said plurality of industrial infrastructure nodes behaves as a single industrial infrastructure node and during 802.11 slot said plurality of industrial infrastructure nodes behaves as said access points.

15. The system of claim 14 wherein said plurality of industrial sensors is configured to transmit data to said plurality of industrial infrastructure nodes only in an FHSS slot 43 of said FHSS slot and to enter a sleep mode in said 802.11 slot.

* * * * *